May 28, 1946.   L. T. POCKMAN   2,401,101
APPARATUS FOR DETECTING LEAKS
Filed July 3, 1944   2 Sheets-Sheet 1
Fig·1·
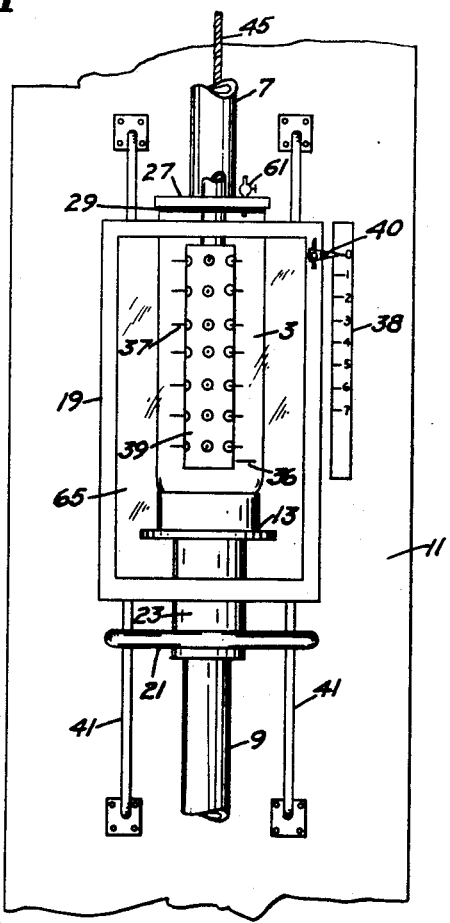
Fig·3·
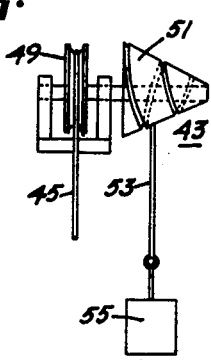
INVENTOR.
LEONARD T. POCKMAN
BY
Lippincott & Metcalf
ATTORNEYS

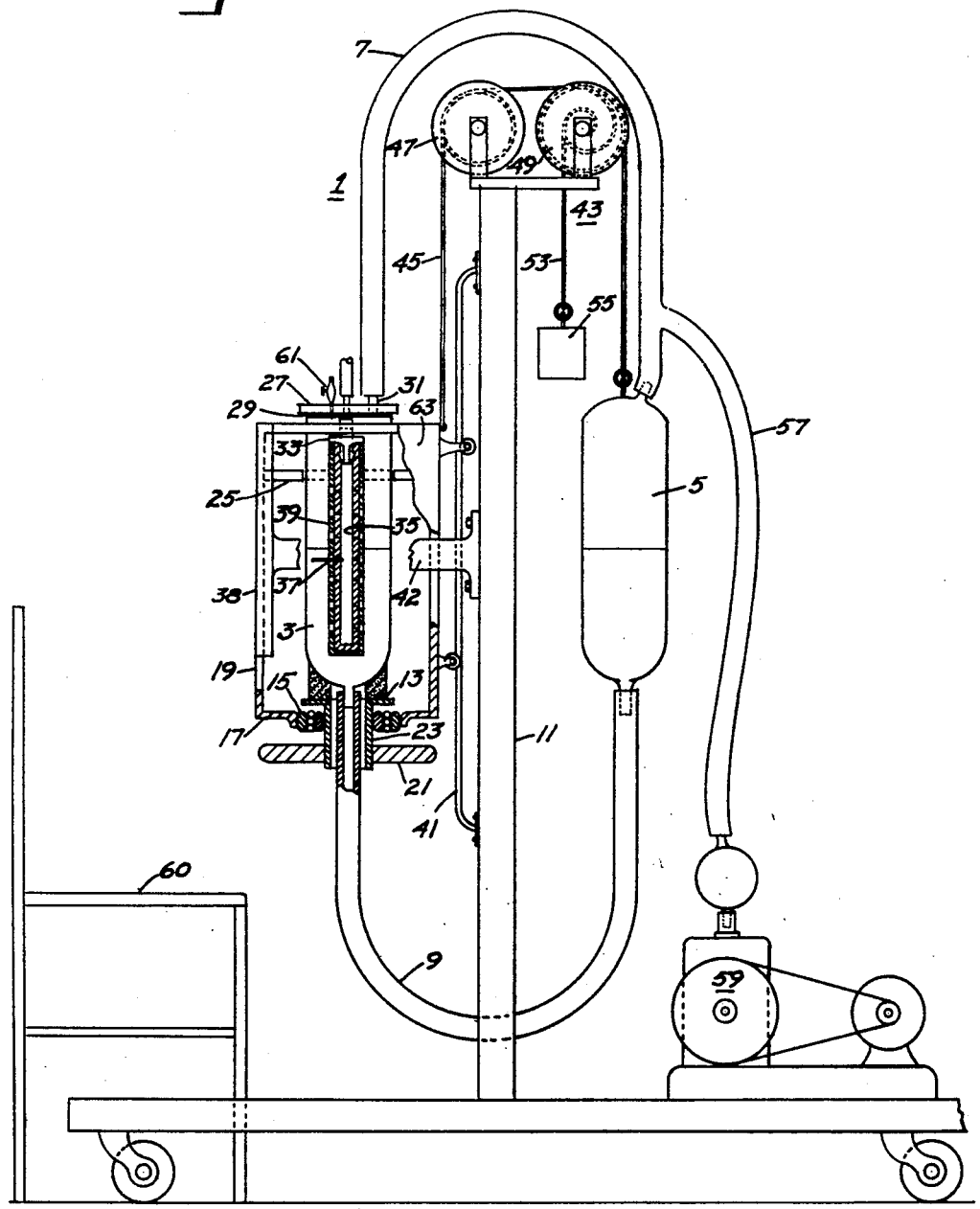

Patented May 28, 1946

2,401,101

UNITED STATES PATENT OFFICE 2,401,101

APPARATUS FOR DETECTING LEAKS

Leonard T. Pockman, San Francisco, Calif., assignor to Heintz & Kaufman, Ltd., South San Francisco, Calif., a corporation of Nevada Application July 3, 1944, Serial No. 543,262

7 Claims. (Cl. 73—40)

My invention relates to a novel apparatus for detecting leaks and more particularly leaks of a microscopic nature such as are encountered in connection with elements utilized in the manufacture of vacuum tubes. Among such elements which constitute the greater source of trouble in this respect, is the tungsten wire employed as lead-in and electrode supports.

In the formation of tungsten wire, the metal, by reason of its known characteristics, must be swaged to proper size and shape. If such operation is not carried on under continuous and strict supervision, the wire in parts will be found to be imperfect, due to formation of pores or cracks, which in the majority of cases are of a microscopic order and undetectable by the human eye. In the normal course of events therefore, such defects are not detected until the vacuum tubes embodying such defective wire, have been completed and placed on test, such defects then showing up as a loss of vacuum in those tubes, which of course renders such tubes useless for any purpose.

Among the objects of my invention are:

1. To provide a novel and improved apparatus for the detection of leaks, and particularly leaks of a microscopic character;

2. To provide a novel and improved apparatus for detecting leaks in elements such as tungsten wire or the like;

3. To provide a novel and improved apparatus for rapidly detecting leaks in elements such as tungsten wire or the like;

4. To provide a novel and improved apparatus for detecting leaks on a quantity production basis.

Additional objects of my invention will be brought out in the following description of a specific embodiment of my invention taken in conjunction with the accompanying drawings wherein:

Figure 1 is a fragmentary front elevational view of a preferred embodiment of my apparatus;

Figure 2 is a full length side elevational view partly in section, of the same apparatus;

Figure 3 is a detail depicted at 90° to its position in Figure 2.

As to my novel and improved procedure, it in general involves the submersion of an element to be tested into a liquid, applying a gas under pressure to such element directly, and enlarging any gas bubbles emerging from the submerged element by reducing the pressure at the surface of the liquid to a value substantially less than atmospheric pressure.

I have found that such reduction of pressure at the surface of the liquid greatly increases the diameter of the bubbles emerging from the element under test and causes the bubbles to grow markedly in size during their rise to the surface, thus making readily visible evidence of microscopic leaks which might ordinarily escape detection by an observer.

Also, I have found that such reduction in pressure, so facilitates the leakage of gas through the element under test, where a leak exists, that even where the leak may be so small that the presence of the liquid might otherwise inhibit the flow of gas therethrough, evidence of such leak will manifest itself in readily visible form.

A preferred form of apparatus adapted for the practice of my procedure, comprises a closed loop 1 including a receptacle preferably in the form of a bell jar 3 and reservoir tank 5 interconnected between their upper ends by an upper section 7 of hose or pipe and between their lower ends by a similar section 9. The loop is supported on a platform mounted panel 11 in a manner to permit limited shifting movement thereof in rotation, the details of which will be subsequently described.

The bell jar 3, in inverted position, rests on a cushioned turn-table 13, carried by a ballbearing race 15 installed in the floor 17 of a frame 19 surrounding the bell jar. The turn-table allows for rotation of the bell jar, in that it is manually controllable through a hand wheel 21 below the frame and connecting with the turn-table by means of a hollow shaft 23. Such shaft being hollow, permits passage of the lower hose section 9 for connection to the lower end of the jar.

A horizontal partition 25 in the upper portion of the frame 19 serves to center the bell jar and lend its support thereto without inhibiting rotational movement of the jar.

The upper end of the bell jar is closed by a cover 27 and an intermediately positioned gasket 29 to enable the cover to be sealed to the jar during testing periods, upon the application of a differential pressure to such cover. The connection of the upper hose section to the upper end of the bell jar is by way of a nipple 31 formed on such cover. The cover is provided at its center with an opening through which may be affixed a pneumatic hose coupling 33 which is adapted to suspend within the bell jar, a tube 35, preferably of heavy rubber closed at its lower end to constitute an elongated tubular chamber. Access thereto from outside the bell jar is permitted by the pneumatic hose coupling 33.

The wall of this tube 35 is provided with numerous perforations arranged in accordance with a suitable plan, and preferably in rows both vertically and horizontally disposed, with each perforation identified as to its position in a horizontal row, by an appropriate indication applied closely adjacent thereto. These perforations are adapted to receive and frictionally grip sections of tungsten wire 37 or the like, usable in the manufacture of vacuum tubes, and in the event such sections of wire be beaded, as is the practice when such wires are to be sealed in the walls of the vacuum tubes, the perforations are adapted to receive such beaded sections of wire.

A reinforcing screen or casing 39 having enlarged openings concentric with the perforations, surrounds the rubber tube 35 and precludes bulging thereof in the event that gas admitted to the tube is at sufficiently high pressure to normally bulge the wall thereof. Such bulging of the wall of the tube 35, if permitted, would expand the perforations and destroy the sealing effect of the tube wall about each of the elements under test, thereby rendering false indications of leaks. Furthermore, when the holes in the reinforcing screen are chosen of appropriate diameter, an increase in the internal pressure will increase the frictional gripping force of the resilient material on the element at a faster rate than the increase of the extruding force exerted by the pressure differential.

Sufficient liquid is added to the system to establish a liquid level in the bell jar capable of being raised to the upper end of the tube 35 in response to a lowering of the position of the bell jar.

A calibration mark 36 on the jar just below the lowest horizontal row level serves to indicate a starting level in the use of the apparatus for testing. The various horizontal rows may then be indicated on a vertical scale 38 by means of a pointer 40 adjustably fixed to the bell jar frame 19, the frame being supported from the panel 11 by a bracket 42.

In supporting the closed loop on the panel, the bell jar carrying frame 19 is mounted for vertical movement within limits, on a pair of parallel rails 41 affixed to the front surface of the panel 11, the weight of the frame and apparatus supported thereby being counter-balanced by the reservoir tank 5, and a specially designed counterweight assembly 43 to take care of the initial difference in weight between the two when the liquid level in both the jar and tank is the same, and compensate for the variations in such difference due to spreading of liquid levels as the bell jar frame and associated apparatus is shifted along the rails 41. In counter-balancing the bell jar frame and associated apparatus, a cable 45 connecting the bell jar frame 19 to the reservoir tank 5 is strung over a pair of pulleys 47 and 49 mounted at the top of the panel, the cable making preferably slightly more than a complete turn about the second pulley 49. The counter-weight compensating assembly 43 is mounted on the shaft of the pulley 49 and comprises a conical pulley 51 keyed to this shaft and provided with a spiral thread for receiving the line 53 by which a compensating counter-weight 55 is suspended. The conical shape of the counter-weight assembly pulley 51 will change the leverage or moment arm of the compensating counter-weight 55 as the pulley is rotated, the extent of such change being correlated to the variations in the weight difference of the liquid in both halves of the loop 1 with shifting of the bell jar cage 19 and associated apparatus along the vertical rails on which it is mounted. Whether the thread on the conical pulley 51 be right or left handed, is immaterial in so far as its compensating function is concerned, but it must be taken into consideration in connection with the weight of the bell jar frame and associated apparatus relative to the reservoir tank. In other words, if the bell jar frame and associated apparatus is heavier than the reservoir tank, then the direction of the thread must be such that the compensating counter-weight will assist the reservoir tank in counter-balancing the bell jar frame and its associated apparatus. If the reservoir tank be the heavier of the two assemblies, then the compensating counter-weight line will be wrapped in the opposite direction.

The mean radius of the frustum of the cone over which the thread courses is chosen to provide the correct magnitude of the static, counter-balancing torque needed when the liquid is equally distributed between reservoir and bell jar. The rate of variation of the counterbalancing torque is independent of this mean radius and depends only on the taper of the cone, the turns per inch of the thread and the weight of the counter-weight 55. This makes it possible to satisfy both the static and variable counter-balancing requirements by proper design of cone and choice of counter-weight.

At some point in the upper hose section 7 of the closed loop, I draw off a hose connection 57 to a high vacuum pump 59 whereby, as desired, the pressure above the liquid level in both halves of the closed loop may be reduced substantially below atmosphere pressure, to cause a vacuum to be formed simultaneously above the liquid in the bell jar 3 and above the liquid in the reservoir tank 5.

In operating the apparatus as set up and described, to carry out the procedural steps indicated, the rubber tube 35 is loaded with elements to be tested for leaks, in this case sections of tungsten wire either bare or beaded, and the tube so loaded, is suspended in the bell jar by the pneumatic hose coupling 33. The bell jar is first raised however, by shifting the supporting frame 19 upwardly on its guide rails 41 preferably until the liquid level coincides with the calibration mark 36. The pointer 40 is then adjusted to the zero reading on the vertical scale 38. With these adjustments completed, the vacuum pump 59 is set into operation to reduce the pressure above the liquid level in the bell jar. Simultaneously with such reduction in pressure, gas at atmospheric pressure or greater is admitted to the interior of the tube 35. Under these conditions, the bell jar is lowered until the first horizontal row of elements to be tested is submerged below the surface of the liquid in the bell jar, the pointer 40 then indicating horizontal row number one on the scale 38.

At this point in the discussion of my invention, it might be well to point out that if the reservoir tank 5 be designed to have the same cross-sectional area as the bell jar 3 exclusive of the cross-sectional area occupied by the tube 35, the liquid level in the bell jar will remain stationary with respect to the panel platform, for any position to which the bell jar may be shifted.

When the first row of elements under test has been submerged below the surface of the liquid, an operator occupying a chair 60 in front of the apparatus, may by means of the wheel 21, rotate the bell jar and tube 35 through a complete revolution, so as to present each wire in that particular row to the operator in succession. Any defects in any of the wire elements, in the form of leaks, will manifest themselves by the presence of gas bubbles originating at the surface of such elements and growing in size as they float to the surface. Those elements which manifest indications of leaks, are identifiable by the operator by means of the identification numbers appearing close by on the wall of the tube and the row number indicated on the scale 38.

Following a similar inspection of all rows of elements, the vacuum above the level of the liquid is broken by means of a manually controlled valve 61 in the cover of the bell jar, and any gas pressure above atmospheric pressure being supplied to the tube 35 is shut off. The cover is lifted, and the tube removed, following which the defective elements are separated from the good ones and discarded. The tube 35 is again loaded and the testing procedure is repeated.

Inasmuch as the pressure is lowest at the surface of the liquid, bubbles formed just below the surface for any given sized leak, will be greater in diameter than bubbles emerging from the same leaky element at a greater depth in the liquid, though such latter bubbles will grow as they approach the surface. However, the identification of a particular leaky element is considerably facilitated when examined close to the surface of the liquid by reason of the larger size of the bubbles as they emerge from the element. My apparatus provides for such examination of the elements. Also by following this procedure, the chances of microscopic leaks plugging up before an examination can be made is minimized.

Inasmuch as the leaks with which we are primarily concerned, are for the most part, of a microscopic nature, the character of the liquid employed as well as the nature of the gas admitted into the tube under pressure are of considerable importance toward realizing the most efficient and practical results.

The liquid employed for example must have a boiling point above room temperature at the pressure of the partial vacuum at the surface of the liquid. The liquid must also have as small a ratio of surface tension to viscosity as it is practical to obtain, and in addition the adhesive force between the liquid and the object being tested should be minimized. These requirements are dictated by the necessity for preventing the liquid from plugging small holes by capillary action. A liquid having such characteristics, furthermore, provides a sufficient time interval in which to make observations under such circumstances as where the leaks are so minute that they ultimately do become plugged up due to the penetration of the liquid into the small leak passages.

A liquid which has been found to embody to a desirable extent, the characteristics outlined above, is a moderately high viscosity lubricating oil that has been thoroughly cleaned of all impurities. When such liquid is employed, however, the tube 35 with its load of wire elements under test, when removed from the bell jar after having been tested, is first cleaned in a degreaser before removing any of the tested elements.

As for the gas employed, this preferably should be a gas of low viscosity, such as hydrogen, carbon dioxide, nitrogen, or the like, such gases of low viscosity having greater penetrating action into and through such pores or leak channels which may exist in the elements under test.

If hydrogen or any other gas so employed is known to be of an explosive nature, it becomes desirable to exercise some precaution as a protection to an operator, and in this connection, I prefer to enclose the bell jar frame 19 on three sides, namely at the back and sides with metal walls 63, leaving the front which faces the operator, to be covered by shatter-proof glass 65. This protective shield is essential in any case to protect the operator from a possible implosion of the bell jar under vacuum.

Thus while I have described in detail a preferred embodiment of apparatus capable of use in the practice of my procedure for testing for leaks, the same may be altered or modified without departing from the underlying principles of my invention, and I accordingly do not desire to be limited in my protection to the specific details described, except as may be necessitated by the appended claims.

I claim:

1. Apparatus for the detection of leaks in short sections of wire or the like comprising a wall of resilient material having a plurality of perforations therethrough in each of which a section of wire or the like may be inserted and maintained, means for exposing said wall on one side to a liquid and on the other side to a gas under pressure, and means for reducing the normal pressure on the surface of said liquid.

2. Apparatus for the detection of leaks in short sections of wire or the like comprising a vertically positioned tube having a closed lower end and including a wall having a plurality of perforations therethrough in each of which a section of wire or the like may be inserted and maintained, a liquid container within which said tube may be submerged, means for admitting gas into said tube, and means for reducing the normal pressure on the surface of said liquid.

3. Apparatus for the detection of leaks in short sections of wire or the like comprising a receptacle for liquid, a tubular chamber vertically supported in said receptacle, said tubular chamber having a plurality of perforations in the wall thereof in each of which a section of wire or the like may be inserted and maintained, and a connection extending from said chamber to the outside of said receptacle, means for producing relative movement between said tubular chamber and the liquid level in said receptacle throughout the extent of the perforations in the wall of said tubular chamber, and a vacuum pump connection to said receptacle above the liquid level range therein.

4. Apparatus for the detection of leaks in short sections of wire or the like comprising a receptacle for liquid, an elongated tubular chamber vertically supported in said receptacle, said elongated tubular chamber having a plurality of perforations in the wall thereof in each of which a section of wire or the like may be inserted and maintained, and a connection extending from said chamber to the outside of said receptacle for the admission of gas into said chamber, means permitting rotation of said elongated tubular chamber, means for shifting the level of the liquid in said receptacle relative to said elongated tubular chamber, and a vacuum pump connection to said receptacle above the liquid level therein.

5. Apparatus for the detection of leaks in short sections of wire or the like comprising a receptacle for liquid and a liquid reservoir connected to each other at their tops and their bottoms by pipe connections, an elongated tubular chamber vertically supported in said receptacle, said elongated tubular chamber having a plurality of perforations in the wall thereof in each of which a section of wire or the like may be inserted and maintained, and a connection extending from said chamber to the outside of said receptacle for the admission of gas into said chamber, means permitting sufficient vertical movement of said receptacle to alter the liquid level therein throughout the extent of the perforations in the wall of said elongated tubular chamber, and a vacuum pump connection to said receptacle above the liquid level range therein.

6. Apparatus for the detection of leaks in short sections of wire or the like comprising a closed loop including a bell jar for liquid and a liquid reservoir connected to each other at their tops and and their bottoms by hose connections, an elongated tubular chamber of resilient material vertically supported in said bell jar, said elongated tubular chamber having a plurality of perforations in the wall thereof in each of which a section of wire or the like may be inserted and maintained, and a connection extending from said chamber to the outside of said bell jar for the admission of gas into said chamber, means permitting sufficient vertical movement of said bell jar to alter the liquid level therein throughout the extent of the perforations in the wall of said elongated tubular chamber, and a vacuum pump connection to said closed loop at a point therein connecting the tops of said bell jar and said reservoir.

7. Apparatus for the detection of leaks in a section of wire or the like comprising a wall of resilient material having a perforation therethrough in which a section of wire or the like may be inserted and maintained, means for exposing said wall on one side to a gas and the other side to a moderately high viscosity oil with the pressure on the gas side exceeding the pressure on the oil side.

LEONARD T. POCKMAN.